US011339722B2

(12) United States Patent
McCaffrey

(10) Patent No.: US 11,339,722 B2
(45) Date of Patent: May 24, 2022

(54) AIR SEAL INTERFACE WITH AFT ENGAGEMENT FEATURES AND ACTIVE CLEARANCE CONTROL FOR A GAS TURBINE ENGINE

(71) Applicant: Raytheon Technologies Corporation, Farmington, CT (US)

(72) Inventor: Michael G. McCaffrey, Windsor, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/172,858

(22) Filed: Feb. 10, 2021

(65) Prior Publication Data

US 2021/0189969 A1 Jun. 24, 2021

Related U.S. Application Data

(63) Continuation of application No. 16/194,857, filed on Nov. 19, 2018, now Pat. No. 10,934,941.

(51) Int. Cl.
*F02C 7/28* (2006.01)
*F01D 11/12* (2006.01)
*F01D 25/24* (2006.01)

(52) U.S. Cl.
CPC ............... *F02C 7/28* (2013.01); *F01D 11/122* (2013.01); *F01D 25/24* (2013.01); *F05D 2240/55* (2013.01); *F05D 2260/30* (2013.01)

(58) Field of Classification Search
CPC .......... F02C 7/28; F01D 11/122; F01D 25/24; F05D 2240/55; F05D 2260/30
See application file for complete search history.

(56) References Cited

U.S. PATENT DOCUMENTS

| 5,145,316 A | 9/1992 | Birch |
| 5,192,185 A | 3/1993 | Leonard |
| 5,232,340 A | 8/1993 | Morgan |
| 5,927,942 A | 7/1999 | Stahl et al. |

(Continued)

FOREIGN PATENT DOCUMENTS

| EP | 2612951 A2 | 7/2013 |
| EP | 3112606 A1 | 1/2017 |

(Continued)

OTHER PUBLICATIONS

European Search Report dated Feb. 14, 2020 issued for corresponding European Patent Application No. 19197170.4.

(Continued)

*Primary Examiner* — Eldon T Brockman
*Assistant Examiner* — Brian O Peters
(74) *Attorney, Agent, or Firm* — Bachman & LaPointe, P.C.

(57) ABSTRACT

An interface for a gas turbine engine. The interface includes a full-hoop vane ring around the engine axis, the full-hoop vane ring comprises a forward vane rail with a vane ring forward contact surface and a vane ring anti-rotation tab, the vane ring anti-rotation tab engaged with the anti-rotation case slot; and a multiple of BOAS segments around the engine axis, each of the multiple of BOAS segments comprise a BOAS aft engagement feature and a BOAS aft contact surface, the BOAS aft engagement feature engaged with the outer case and the anti-rotation case slot, the BOAS aft contact surface abuts the vane ring forward contact surface.

17 Claims, 6 Drawing Sheets

(56) References Cited

U.S. PATENT DOCUMENTS

| | | | |
|---|---|---|---|
| 7,008,183 B2 | 3/2006 | Sayegh et al. |
| 7,147,429 B2 | 12/2006 | Czachor et al. |
| 7,407,368 B2 | 8/2008 | Tanaka |
| 7,771,160 B2 | 8/2010 | Shi et al. |
| 7,866,943 B2 | 1/2011 | Durand et al. |
| 8,181,555 B2 | 5/2012 | Clements et al. |
| 8,439,629 B2 | 5/2013 | Pietraszkiewicz et al. |
| 8,511,975 B2 | 8/2013 | Shi et al. |
| 8,550,768 B2 | 10/2013 | Montgomery |
| 8,579,580 B2 | 11/2013 | Albers et al. |
| 8,651,497 B2 | 2/2014 | Tholen et al. |
| 8,684,689 B2 | 4/2014 | Guo et al. |
| 8,740,552 B2 | 6/2014 | Marusko et al. |
| 8,753,073 B2 | 6/2014 | Albers et al. |
| 8,763,248 B2 | 7/2014 | Carrier |
| 8,834,105 B2 | 9/2014 | Albers et al. |
| 8,834,106 B2 | 9/2014 | Luczak |
| 8,905,709 B2 | 12/2014 | Dziech et al. |
| 8,998,573 B2 | 4/2015 | Albers et al. |
| 9,228,447 B2 | 1/2016 | McCaffrey |
| 9,439,636 B2 | 9/2016 | Stopek |
| 9,574,455 B2 | 2/2017 | McCaffrey |
| 9,957,829 B2 | 5/2018 | Shepherd |
| 9,976,435 B2 | 5/2018 | Borja et al. |
| 9,988,934 B2 | 6/2018 | Spangler |
| 10,041,369 B2 | 8/2018 | Blaney et al. |
| 10,323,534 B2 | 6/2019 | McCaffrey |
| 10,443,615 B2 | 10/2019 | O'Toole et al. |
| 2005/0002780 A1 | 1/2005 | Tanaka |
| 2005/0004810 A1 | 1/2005 | Tanaka |
| 2007/0231132 A1 | 10/2007 | Durand et al. |
| 2009/0324350 A1 | 12/2009 | Clements et al. |
| 2012/0171027 A1 | 7/2012 | Albers et al. |
| 2012/0183394 A1 | 7/2012 | Guo et al. |
| 2013/0011248 A1 | 1/2013 | Croteau et al. |
| 2014/0017072 A1 | 1/2014 | McCaffrey |
| 2014/0212273 A1 | 7/2014 | LeBorgne |
| 2016/0010482 A1 | 1/2016 | Rogers et al. |
| 2016/0153306 A1 | 6/2016 | Romanov et al. |
| 2017/0122120 A1 | 5/2017 | McCaffrey |
| 2017/0292398 A1 | 10/2017 | Wasserman et al. |
| 2017/0284225 A1 | 11/2017 | Hashimoto |
| 2018/0080345 A1 | 3/2018 | Debray et al. |
| 2018/0142564 A1 | 5/2018 | Taglieri et al. |
| 2018/0202306 A1 | 7/2018 | Hudson et al. |
| 2018/0363486 A1 | 12/2018 | Smoke et al. |
| 2018/0363499 A1 | 12/2018 | Smoke et al. |
| 2020/0103036 A1 | 4/2020 | Davis |
| 2020/0149417 A1 | 5/2020 | McCaffrey |
| 2020/0158022 A1 | 5/2020 | McCaffrey |
| 2020/0158023 A1 | 5/2020 | McCaffrey |

FOREIGN PATENT DOCUMENTS

| | | |
|---|---|---|
| EP | 3351732 A1 | 7/2018 |
| EP | 3351740 A1 | 7/2018 |
| GB | 2239678 A | 7/1991 |
| GB | 2486964 A | 7/2012 |
| WO | 2014152209 A1 | 9/2014 |
| WO | 2015020708 A2 | 2/2015 |
| WO | 2015021029 A1 | 2/2015 |

OTHER PUBLICATIONS

European Search Report dated Mar. 23, 2020 issued for corresponding European Patent Application No. 19198435.0.

U.S. Non-Final Office Action dated Jul. 1, 2020 issued for corresponding U.S. Appl. No. 16/194,852.

U.S. Non-Final Office Action dated Apr. 23, 2020 issued for corresponding U.S. Appl. No. 16/189,233.

AIR SEAL INTERFACE WITH AFT ENGAGEMENT FEATURES AND ACTIVE CLEARANCE CONTROL FOR A GAS TURBINE ENGINE

CROSS-REFERENCE TO RELATED APPLICATION

This application is a continuation of U.S. patent application Ser. No. 16/194,857 filed Nov. 19, 2018.

U.S. GOVERNMENT RIGHTS

This invention was made with Government support under contract W58RGZ-16-C-0046 awarded by the United States Army. The Government has certain rights in the invention.

BACKGROUND

The present disclosure relates generally to a gas turbine engine, and more particularly to an air seal interface arrangement.

Gas turbine engines include a compressor that compresses air, a combustor that burns the compressed air, and a turbine across which the combustion gases are expanded. The expansion of the combustion gases drives the turbine, which in turn drives rotation of a power turbine and the compressor.

Turboshaft engines, which are often used in rotary wing aircraft applications, are typically smaller than turbofan aircraft engines and are often subject to prolonged operations in dusty environments. These factors often require an erosion resistant abradable blade outer air seal in the compressor. The relatively small engine diameter makes efficiency and stability sensitive to tip clearance, while the harsh operating environment tends to erode the abradable coatings at undesirable rates.

An engine casing of an engine static structure may include one or more blade outer air seals (BOAS) that provide an outer radial flow path boundary for the hot combustion gases. The BOAS surround respective rotor assemblies that rotate and extract energy from the hot combustion gases. The BOAS may be subjected to relatively intense temperatures during gas turbine engine operation.

In order to increase efficiency, a clearance between the blade tips of the rotor assemblies and the outer radial flow path boundary is relatively small. This ensures that a minimum amount of air passes between the blade tips and the outer radial flow path boundary. The abradable BOAS further reduces the tip clearance as the blade tips are designed to, at times, rub against the BOAS. The rubbing wears the abradable material such that the blade tips then have a reduced tip clearance relative to the idealized geometry.

The performance impact of leakage at the blade tip is proportional to the ratio between the tip clearance (gap between the blade tip shroud and BOAS), and the overall size of the flow path such that, the smaller the engine the larger the percentage that the tip clearance is relative to the whole flow. Relatively small engines are thus much more sensitive to tip clearance than larger engines. The lowest leakage design is a full-hoop BOAS ring because it eliminates the additional leakage due to the gap between adjacent segmented BOAS. However, a full-hoop BOAS ring complicates design of a tight tip clearance in a power turbine because the BOAS ring typically grows more in radius than do the rotor blades which increases the tip clearance.

Power turbines may be particularly difficult to seal due to the size of engine components and the relative tolerances. As a result, it is advantageous to design full-hoop ring blade outer air seals and vanes. The nature of the full-hoop design has very low inherent leakage, due the absence of segmentation gaps. However, the nature of full-hoop ring results in more significant thermal expansion and contraction independent of the surrounding engine case structures, which precludes the use of active clearance control systems. Active clearance control systems shrink the outer engine case with cool air, which moves segmented vanes and BOAS inward to reduce tip clearance.

SUMMARY

An interface for a gas turbine engine according to one disclosed non-limiting embodiment of the present disclosure includes an outer case that defines an engine axis, the outer case comprises an anti-rotation case slot; a full-hoop vane ring around the engine axis, the full-hoop vane ring comprises a forward vane rail with a vane ring forward contact surface and a vane ring anti-rotation tab, the vane ring anti-rotation tab engaged with the anti-rotation case slot; and a multiple of BOAS segments around the engine axis, each of the multiple of BOAS segments comprise a BOAS aft engagement feature and a BOAS aft contact surface, the BOAS aft engagement feature engaged with the outer case and the anti-rotation case slot, the BOAS aft contact surface abuts the vane ring forward contact surface.

A further embodiment of any of the foregoing embodiments include that the vane ring forward contact surface loads against the BOAS segment contact surface in response to attachment of a second outer case to the engine case, the second case abuts with the full-hoop vane ring.

A further embodiment of any of the foregoing embodiments include that the second case module comprises a turbine exhaust case.

A further embodiment of any of the foregoing embodiments of the present disclosure includes a full hoop seal arranged around the engine axis, the multiple of BOAS segments load against the full hoop seal.

A further embodiment of any of the foregoing embodiments include that the full hoop seal is a dogbone seal.

A further embodiment of any of the foregoing embodiments include that the BOAS aft engagement feature of each of the multiple of BOAS segments comprises at least one BOAS anti-rotation tab.

A further embodiment of any of the foregoing embodiments include that the BOAS aft engagement feature is engaged with the engine case, the BOAS aft engagement feature forms a forward facing hook.

A further embodiment of any of the foregoing embodiments include that the BOAS anti-rotation tab abuts the vane ring anti-rotation tab.

A further embodiment of any of the foregoing embodiments include that the forward vane rail comprises a groove to receive a seal.

A further embodiment of any of the foregoing embodiments include that each of the multiple of BOAS segments comprises a circumferential feather seal slot to seal between each of the multiple of BOAS segments.

A further embodiment of any of the foregoing embodiments include that the BOAS segment contact surface is transverse to the BOAS aft engagement feature.

A further embodiment of any of the foregoing embodiments include that the outer case comprises a case groove with an anti-rotation slot that receives the vane ring anti-rotation tab and the BOAS anti-rotation tab.

A further embodiment of any of the foregoing embodiments include that the BOAS aft engagement feature comprises a rail with the BOAS anti-rotation tab to receive the vane ring anti-rotation tab.

A further embodiment of any of the foregoing embodiments include that the wherein the BOAS aft engagement feature is a hooked rail.

A further embodiment of any of the foregoing embodiments of the present disclosure includes a BOAS forward engagement feature received within a groove in the case, the BOAS aft engagement feature forms a hook.

A further embodiment of any of the foregoing embodiments include that the hooked rail extends forward engagement feature.

A method of assembling a module for a gas turbine engine according to one disclosed non-limiting embodiment of the present disclosure includes installing a full-hoop vane ring around an engine axis into a case groove with an anti-rotation slot in an engine case, the full-hoop vane ring comprises an aft vane rail with a vane ring forward contact surface and a vane ring anti-rotation tab received into the anti-rotation slot in an engine case; and installing a multiple of BOAS segments around the engine axis, each of the multiple of BOAS segments comprise a BOAS aft engagement feature, a BOAS aft contact surface, and a BOAS anti-rotation tab, the BOAS anti-rotation tab engaged with the anti-rotation case slot such that the BOAS aft contact surface abuts the vane ring forward contact surface.

A further embodiment of any of the foregoing embodiments of the present disclosure includes attaching a second outer case to seal the BOAS segment contact surface with the vane ring forward contact surface.

A further embodiment of any of the foregoing embodiments of the present disclosure includes compressing a seal between the full-hoop vane ring and a second multiple of BOAS segments forward of the full-hoop vane ring.

A further embodiment of any of the foregoing embodiments of the present disclosure includes installing the seal within a groove formed in the full-hoop vane ring.

The foregoing features and elements may be combined in various combinations without exclusivity, unless expressly indicated otherwise. These features and elements as well as the operation thereof will become more apparent in light of the following description and the accompanying drawings. It should be appreciated that the following description and drawings are intended to be exemplary in nature and non-limiting.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
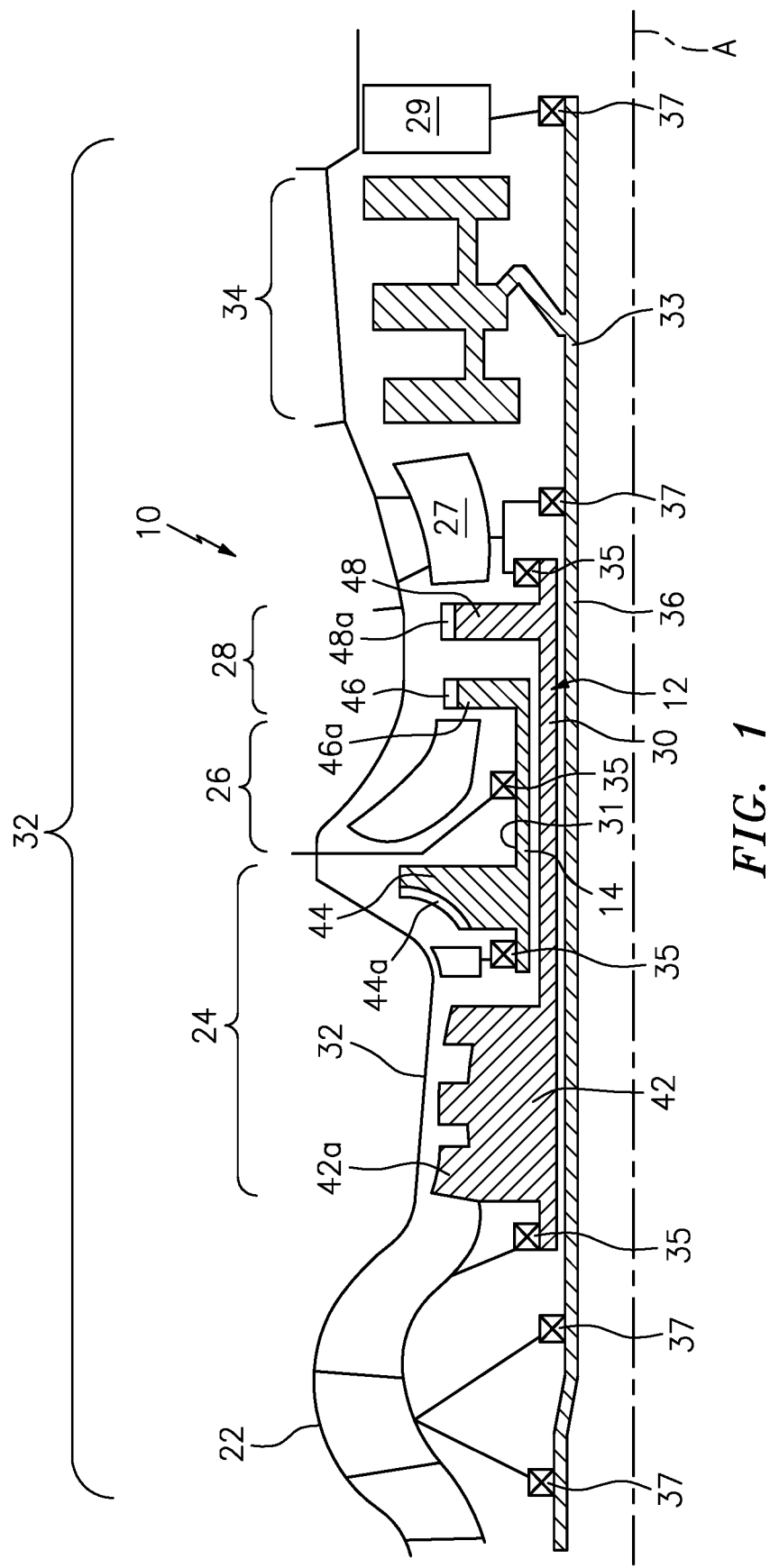
FIG. 1 illustrates an example turboshaft gas turbine engine.

FIG. 1 schematically illustrates a gas turbine engine 10. In this embodiment, the engine 10 is a three-spool turboshaft engine, such as for a helicopter with a low spool 12, a high spool 14 and a power turbine spool 33 mounted for rotation about an engine central longitudinal axis A. The engine 10 includes an inlet duct module 22, a compressor section 24, a combustor section 26, a turbine module 28, and a power turbine module 34.

The compressor section 24 includes a low pressure compressor 42 with a multitude of circumferentially-spaced blades 42a and a centrifugal high pressure compressor 44 a multitude of circumferentially-spaced blades 44a. The turbine section 28 includes a high pressure turbine 46 with a multitude of circumferentially-spaced turbine blades 46a and a low pressure turbine 48 with a multitude of circumferentially-spaced blades 48a. The low spool 12 includes an inner shaft 30 that interconnects the low pressure compressor 42 and the low pressure turbine 48. The high spool 14 includes an outer shaft 31 that interconnects the high pressure compressor 44 and the high pressure turbine 46.

The low spool 12 and the high spool 14 are mounted for rotation about the engine central longitudinal axis A relative to engine static structure modules 22, 27, and 29 via several bearing systems 35. The power turbine spool 33 is mounted for rotation about the engine central longitudinal axis A, relative to the engine static structure modules 22, 27, and 29 via several bearing systems 37. The engine static structure modules 22, 27, and 29 may include various static structure such as a mid-turbine frame, a power turbine case, a turbine exhaust case and other structures. It should be appreciated that additional or alternative modules might be utilized to form the outer case assembly.

The compressor section 24 and the turbine section 28 drive the power turbine section 34 that drives an output shaft 36. In this example engine, the compressor section 24 has five stages, the turbine section 28 has two stages and the power turbine section 34 has three stages. During operation, the compressor section 24 draws air through the inlet duct module 22. In this example, the inlet duct module 22 opens radially relative to the central longitudinal axis A. The compressor section 24 compresses the air, and the compressed air is then mixed with fuel and burned in the combustor section 26 to form a high pressure, hot gas stream. The hot gas stream is expanded in the turbine section 28 and the power turbine section 34, which rotationally drives the compressor section 24. The hot gas stream exiting the turbine section 28 further expands and drives the power turbine section 34 and the output shaft 36. The compressor section 24, the combustor section 26, and the turbine section 28 are often referred to as the gas generator, while the power turbine section 34 and the output shaft 36 are referred to as the power section. Although not shown, the main shaft 30 may also drive a generator or other accessories through an accessory gearbox. The gas generator creates the hot expanding gases to drive the power section. Depending on the design, the engine accessories may be driven either by the gas generator or by the power section. Typically, the gas generator and power section are mechanically separate such that each rotate at different speeds appropriate for the conditions, referred to as a 'free power turbine.'

Figure 2:
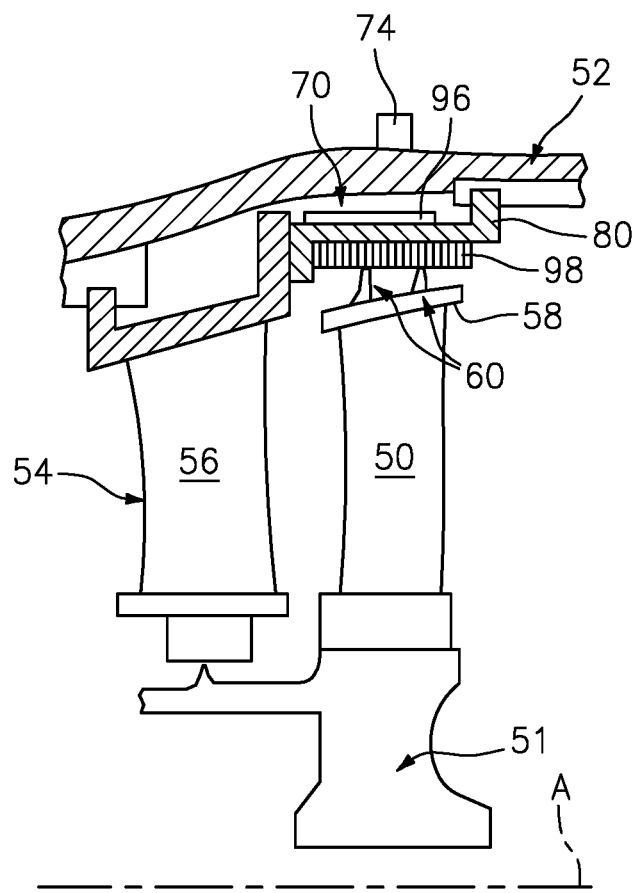
FIG. 2 is a schematic block diagram view of a stage in a section of the gas turbine engine.
Figure 3:
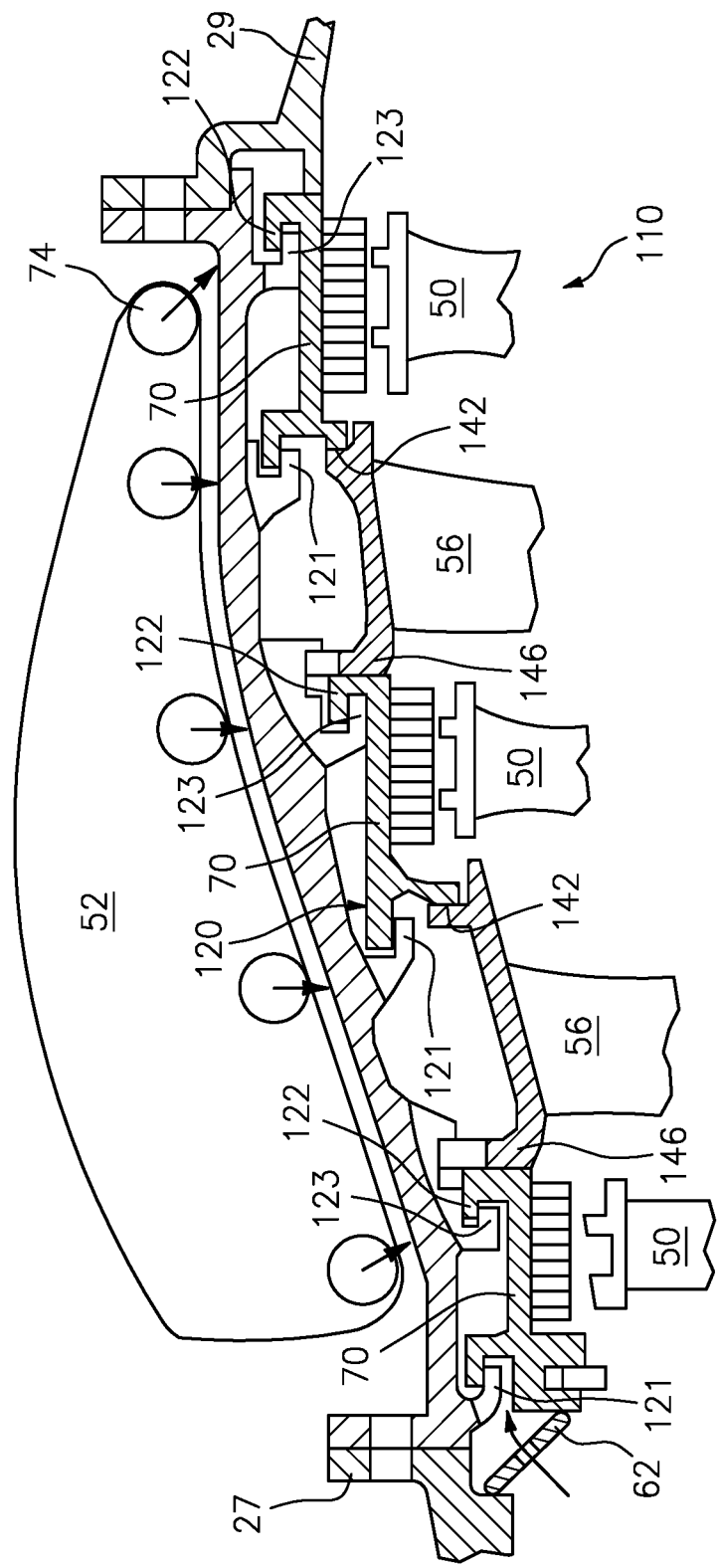
FIG. 3 is a schematic view of an example air seal interface arrangement in a power turbine module section of the gas turbine engine.
Figure 4:
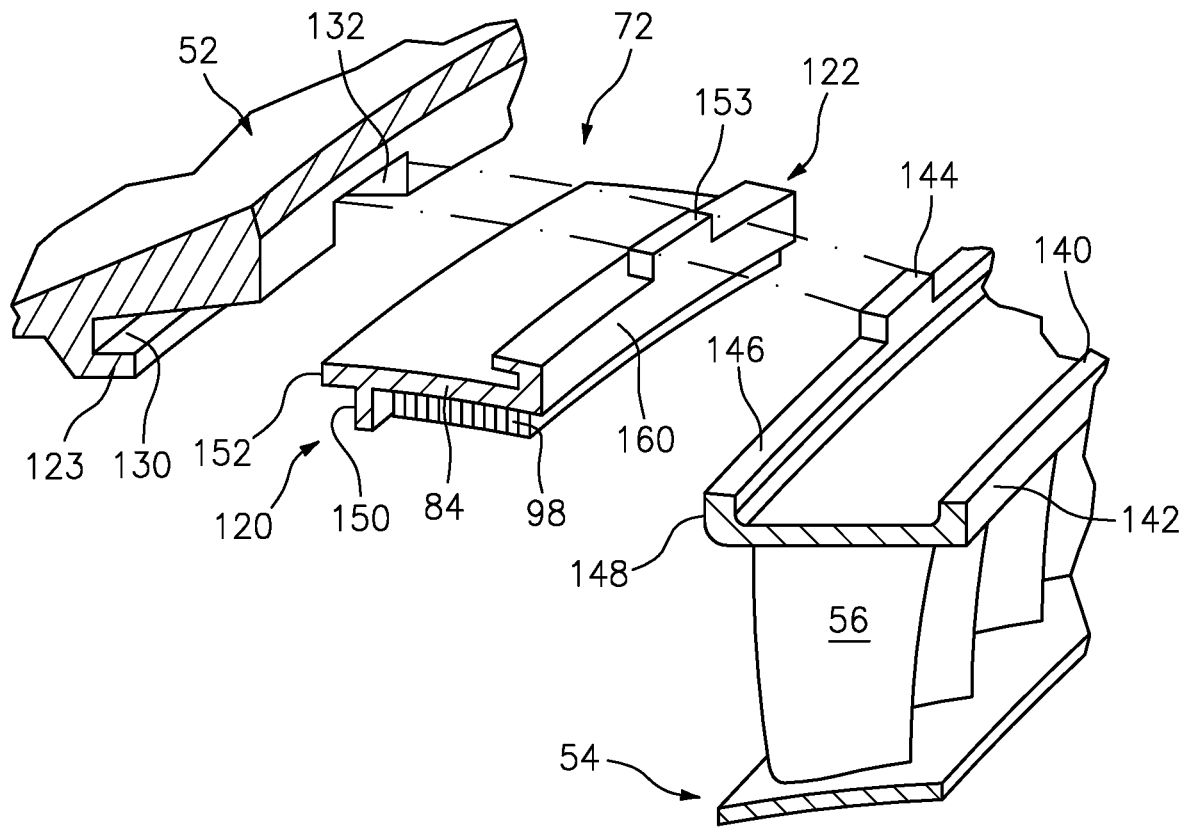
FIG. 4 is an exploded view of the air seal interface arrangement between one blade outer air seal segment, a full-hoop vane ring, and an engine case within the power turbine module section of the gas turbine engine.

FIG. 2 illustrates a stage of an engine section 40 of the gas turbine engine 20 of FIG. 1. In the disclosed illustrated embodiment, the engine section 40 represents the power turbine module 34 (FIG. 1), however, other engine sections and architectures will benefit herefrom. The engine section 40 contains a multiple of full hoop vane rings 56 and a multiple of blade outer air seal (BOAS) assemblies 70 supported within the case 52. The disclosed power turbine 34 includes two vane rings 54 and three blade outer air seal (BOAS) assemblies 70 (FIGS. 3 and 4). The two vane rings 54 and three blade outer air seal (BOAS) assemblies 70 define a stack 110 that is assembled into the case 52.

Each full hoop vane ring 54 contains a multiple of vanes 56 that prepare the airflow for the blades 50. Each blade outer air seal (BOAS) assembly 70 includes a multiple of blade outer air seal (BOAS) segments 72. Each BOAS segment 72 of this exemplary embodiment is circumferentially disposed about the engine centerline longitudinal axis A and is hooked into the engine case 52. Each of the multiple of BOAS segments 72 include a circumferential feather seal slot 71 to receive a feather seal between each of the multiple of BOAS segments 72. The ring of blade outer air seal (BOAS) segments 72 establishes an outer radial flow path boundary of the core flow path. The multiple of blade outer air seal (BOAS) segments 72 permit movement in response to the thermal expansion and contraction of the case 52.

Each BOAS segment 72 is disposed in an annulus radially between the case 52 and the blade tip 58. The blade outer air seal (BOAS) assembly 70 circumscribes associated blades 50 in the stage. Each blade of the multiple of blades 50 include a blade tip 58 with a knife edge 60 that extends toward the respective blade outer air seal (BOAS) assembly 70. The knife edge 60 and the ring of blade outer air seal (BOAS) segments 72 cooperate to limit airflow leakage around the blade tip 58.

Each BOAS segment 72 includes a BOAS body 80 having a radially inner face and a radially outer face. The radially inner face is directed toward the blade tip 58 and the radially outer face faces the case 52. Each BOAS segment 72 may be manufactured of a material having a relatively low coefficient of thermal expansion such as a nickel-chromium-iron-molybdenum alloy or other material that possesses a desired combination of oxidation resistance, fabricability and high-temperature strength. Example materials include, but are not limited to, Mar-M-247, Hastaloy N, Hayes 242, IN792+Hf, HASTELLOY X alloy (UNS N06002 (W86002). Other materials may also be utilized. One or more cooling fins 96 may circumscribe the radially outer face of the BOAS body 80. An abradable seal 98 (also shown in FIG. 4) is secured to the radially inner face of the BOAS body 80. In one example, the abradable seal 98 is a honeycomb seal that interacts with the blade tip 58. A thermal barrier coating may partially or completely fill the seal 98 to protect the underlying BOAS body 80 from exposure to hot gas, reducing thermal fatigue and to enable higher operating conditions.

With reference to FIG. 3, the power turbine section 34 of the gas turbine engine 20 in this embodiment includes a stacked arrangement of blade outer air seal (BOAS) assemblies 70 (three shown) that are installed into the outer case 52, adjacent, and mechanically coupled to, the full-hoop vane rings 54 (two shown) that are also installed to the outer case 52 to form an air seal interface arrangement 114 for the stack 110. The stack 110 is axially clamped, thus the axial clamp load, in combination with the axial gas load, compresses the stacked blade outer air seal (BOAS) assemblies 70 and vane rings 54 to form a stable air seal interface arrangement 114 between the stack 110 and the case 52. A seal member 62, e.g., a dogbone seal, accommodates compression of the stack 110 in response to axial assembly of the static structure modules.

With reference to FIG. 4, the outer case 52 is defined around the engine axis A and includes a case groove 130 with at least one anti-rotation vane slot 132. Although only a single BOAS segment 72 will be described in detail, each BOAS segment 72 installation is generally equivalent and each stage in the power turbine section is generally similar as well such that only one need be specifically described.

The full-hoop vane ring 54 includes an aft vane rail 140 with a vane ring forward contact surface 142. The aft vane rail 140 is engaged with the outer case 52 with a vane ring anti-rotation tab 144. The full-hoop vane ring 54 can thermally expand and contract radially independently with respect to the engine case 52 but is rotationally fixed against torque loads.

An active clearance control system 74 (illustrated schematically) permits changes in the diameter of the blade outer air seal (BOAS) assembly 70 but does not affect the full hoop vane ring 54.

Each BOAS segment 72 includes outer case attachment features such as forward engagement features 120 and an BOAS aft engagement features 122 (that face engine front) that engage corresponding case engagement features 121, 123 (FIG. 3; that face engine aft) that extend radially inwardly from the outer case 52 to provide thermal growth independence, while maintaining the radial fixity requirements of the BOAS segment 72. In this example, the BOAS aft engagement features 122 forms a forward facing hook.

Figure 5:
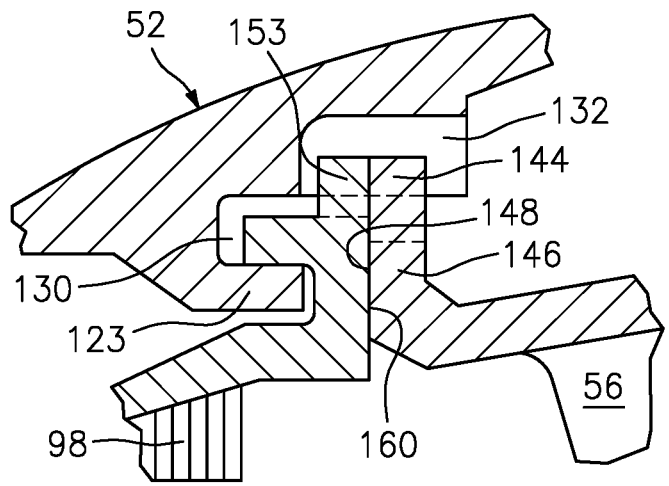
FIG. 5 is a cross-sectional view taken along line 4-4 in FIG. 4 of the FIG. 4 air seal interface arrangement in an assembled condition.

The forward engagement features 120 includes a BOAS contact surface 150 that loads against the corresponding vane ring forward contact surface 142 and a BOAS aft engagement feature 122 that engages the case groove 130. The BOAS aft engagement feature 122 includes a BOAS anti-rotation tab 153 that engages the vane ring anti-rotation tab 144 (FIG. 5). The vane ring anti-rotation tab 144 abuts the BOAS anti-rotation tab 153 which are then locked within the anti-rotation case slot 132 and the forward vane ring rail contact surface 148 abuts the BOAS aft contact surface 160 of the BOAS aft engagement features 122.

The contact surfaces 148, 160 provide a facial axial interface (FIG. 5). Each stage in the stack 110 utilizes such an interface to create stable seal therebetween. In this embodiment, the engine static structure 29 (FIG. 3) such as a turbine exhaust case is assembled to the power turbine case 52 to compress the stack 110 at the BOAS aft contact surface 160 on the aft most BOAS segment 72. That is, the power turbine case 52 is assembled between the engine static structures 27, 29, e.g., the mid turbine frame case and the turbine exhaust case.

Figure 6:
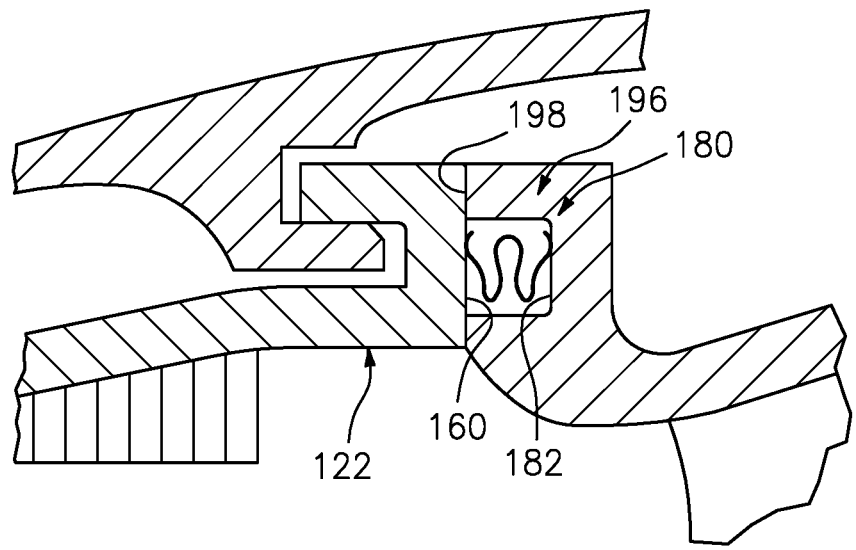
FIG. 6 is a cross-sectional view of an alternative embodiment of the air seal interface arrangement with a W seal at a aft interface of the blade outer air seal segment.
Figure 7:
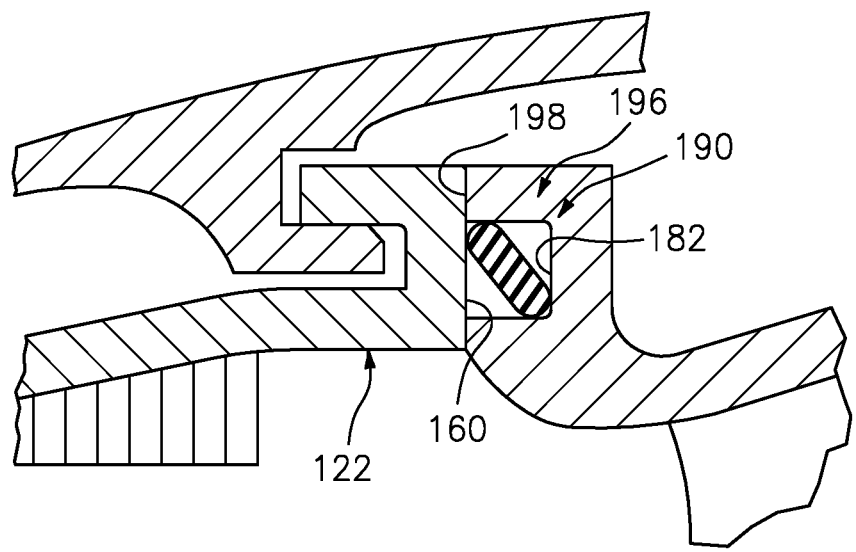
FIG. 7 is a cross-sectional view of an alternative embodiment of the air seal interface arrangement with a diamond seal at a aft interface of the blade outer air seal segment.

With reference to FIG. 6, in embodiments, a W-seal 180 (FIG. 6), or a diamond seal 190 (FIG. 7) may be located in a cavity 182 in the forward vane rail 146 to further minimize air leakage between the BOAS aft engagement features 122 and the forward vane rail 146 of the stack 110. The example W-seal 180 and diamond seal 190 may be manufactured of a precipitation hardened formable superalloy singe crystal composition.

Figure 8:
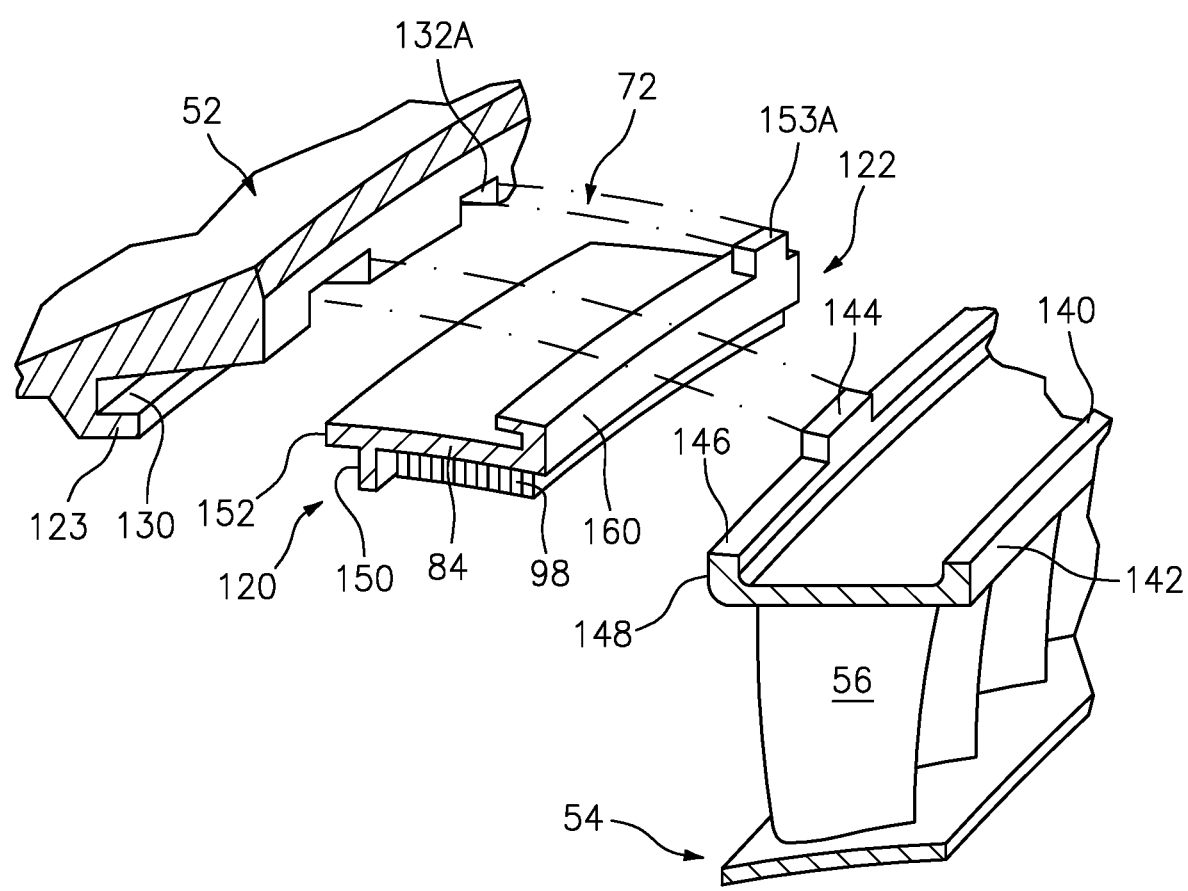
FIG. 8 is an exploded view of an alternative embodiment of the air seal interface arrangement.

With reference to FIG. 8, another embodiment of the interface includes a separate BOAS anti-rotation tab 153A that engages a separate slot 132A in the case 52. The usage of separate slots facilities a different quantity of vane ring anti-rotation tab 144 compared to BOAS anti-rotation tab 153A. For example, 8-12 vane ring anti-rotation tab 144; and 6-20 BOAS anti-rotation tab 153A.

Retaining the full hoop vane rings avoids segmentation leaks in the regions of high flow velocity (and lo static pressure) in the vane throat. The vane rings can be cast as one-piece components. The full hoop vane rings in conjunction with a segmented BOAS assembly enables the use of active clearance control to gain performance.

The architecture facilitates control of the segmented BOAS assembly via an active cooling system, thus increasing engine power and low rpm efficiency.

Although a combination of features is shown in the illustrated examples, not all of them need to be combined to realize the benefits of various embodiments of this disclosure. In other words, a system designed according to an embodiment of this disclosure will not necessarily include all of the features shown in any one of the figures or all of the portions schematically shown in the figures. Moreover, selected features of one example embodiment may be combined with selected features of other example embodiments.

The elements described and depicted herein, including in flow charts and block diagrams throughout the figures may show logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason, the appended claims should be studied to determine true scope and content.

What is claimed is:

1. An interface assembly for a gas turbine engine, comprising:
    an engine case that defines an engine axis, the engine case comprises an anti-rotation case slot;
    a full-hoop vane ring around the engine axis, the full-hoop vane ring comprises a forward vane rail with a vane ring forward contact surface and a vane ring anti-rotation tab, the vane ring anti-rotation tab engaged with the anti-rotation case slot; and
    a multiple of BOAS segments around the engine axis, each of the multiple of BOAS segments comprise a BOAS aft engagement feature and a BOAS aft contact surface, the BOAS aft engagement feature engaged with the engine case and the anti-rotation case slot, the BOAS aft contact surface abuts the vane ring forward contact surface, wherein the BOAS anti-rotation tab is circumferentially offset from the vane ring anti-rotation tab.

2. The interface assembly as recited in claim 1, wherein the vane ring forward contact surface loads against the BOAS segment contact surface in response to attachment of a second engine case to the engine case.

3. The interface assembly as recited in claim 2, wherein the second engine case comprises a turbine exhaust case.

4. The interface assembly as recited in claim 2, wherein the BOAS aft engagement feature of each of the multiple of BOAS segments comprises at least one BOAS anti-rotation tab.

5. The interface assembly as recited in claim 1, further comprising a full hoop seal arranged around the engine axis, the multiple of BOAS segments loaded against the full hoop seal.

6. The interface assembly as recited in claim 5, wherein the full hoop seal is a dogbone seal.

7. The interface assembly as recited in claim 1, wherein the BOAS aft engagement feature is engaged with the engine case, the BOAS aft engagement feature forms a forward facing hook.

8. The interface assembly as recited in claim 1, wherein the forward vane rail comprises a groove to receive a seal.

9. The interface assembly as recited in claim 1, wherein each of the multiple of BOAS segments comprises a circumferential feather seal slot to seal between each of the multiple of BOAS segments.

10. The interface assembly as recited in claim 1, wherein the engine case comprises a case groove with an anti-rotation case slot that receives the vane ring anti-rotation tab and the BOAS anti-rotation tab.

11. The interface assembly as recited in claim 10, wherein the BOAS aft engagement feature comprises a rail with the BOAS anti-rotation tab to receive the vane ring anti-rotation tab.

12. The interface assembly as recited in claim 11, wherein the BOAS aft engagement feature is a hooked rail.

13. The interface assembly as recited in claim 12, further comprising a BOAS forward engagement feature received within a groove in the engine case.

14. A method of assembling a module for a gas turbine engine, comprising:
   installing a full-hoop vane ring around an engine axis into a case groove with an anti-rotation slot in an engine case, the full-hoop vane ring comprises an forward vane rail with a vane ring forward contact surface and a vane ring anti-rotation tab received into the anti-rotation slot in the engine case; and
   installing a multiple of BOAS segments around the engine axis, each of the multiple of BOAS segments comprise a BOAS aft engagement feature, a BOAS aft contact surface, and a BOAS anti-rotation tab, the BOAS anti-rotation tab engaged with the anti-rotation slot in the engine case such that the BOAS aft contact surface abuts the vane ring forward contact surface and the BOAS anti-rotation tab is circumferentially offset from the vane ring anti-rotation tab.

15. The method as recited in claim 14, further comprising attaching a second engine case to the engine case to seal the BOAS segment contact surface with the vane ring forward contact surface.

16. The method as recited in claim 15, further comprising compressing a seal between the full-hoop vane ring and a second multiple of BOAS segments forward of the full-hoop vane ring.

17. The method as recited in claim 16, further comprising installing the seal within a groove formed in the full-hoop vane ring.

* * * * *